United States Patent [19]
Yakame

[11] 4,184,185
[45] Jan. 15, 1980

[54] CASSETTE TAPE EJECTING MECHANISM

[75] Inventor: Ken Yakame, Yamanashi, Japan

[73] Assignee: Kabushiki Kaisha Sankyo Seiki Seisakusho, Shimosuwa, Japan

[21] Appl. No.: 933,376

[22] Filed: Aug. 14, 1978

[30] Foreign Application Priority Data

Aug. 12, 1977 [JP] Japan .................................. 52-97137

[51] Int. Cl.² ........................ G11B 23/04; G11B 15/10
[52] U.S. Cl. ..................................... 360/137; 242/198
[58] Field of Search ..................... 360/137, 78, 77, 96; 242/198

[56] References Cited

U.S. PATENT DOCUMENTS

| | | | |
|---|---|---|---|
| 3,909,844 | 9/1975 | Kawada | 360/137 |
| 3,921,216 | 11/1975 | Wada | 360/78 |
| 3,927,419 | 12/1975 | Tozawa | 360/78 |
| 4,033,491 | 7/1977 | Aldenhoven | 360/137 |
| 4,074,327 | 2/1978 | Berger | 360/78 |
| 4,099,213 | 7/1978 | Schatteman | 242/198 |

FOREIGN PATENT DOCUMENTS 2535814  3/1976  Fed. Rep. of Germany ........... 360/137

*Primary Examiner*—Jay P. Lucas
*Attorney, Agent, or Firm*—Sughrue, Rothwell, Mion, Zinn and Macpeak

[57] ABSTRACT

A cassette tape ejecting mechanism comprises a driving gear wheel with which a first driven gear wheel having at least one non-toothed portion is engagable for manually ejecting the cassette tape through linkage mechanisms by slightly depressing the depressing button and the same driving gear wheel with which a second and third driven gear wheels are engagable for automatically ejecting the cassette tape or automatically reversing the tape winding direction through linkage mechanisms when the tape is fully taken up from one reel to the other.

6 Claims, 14 Drawing Figures

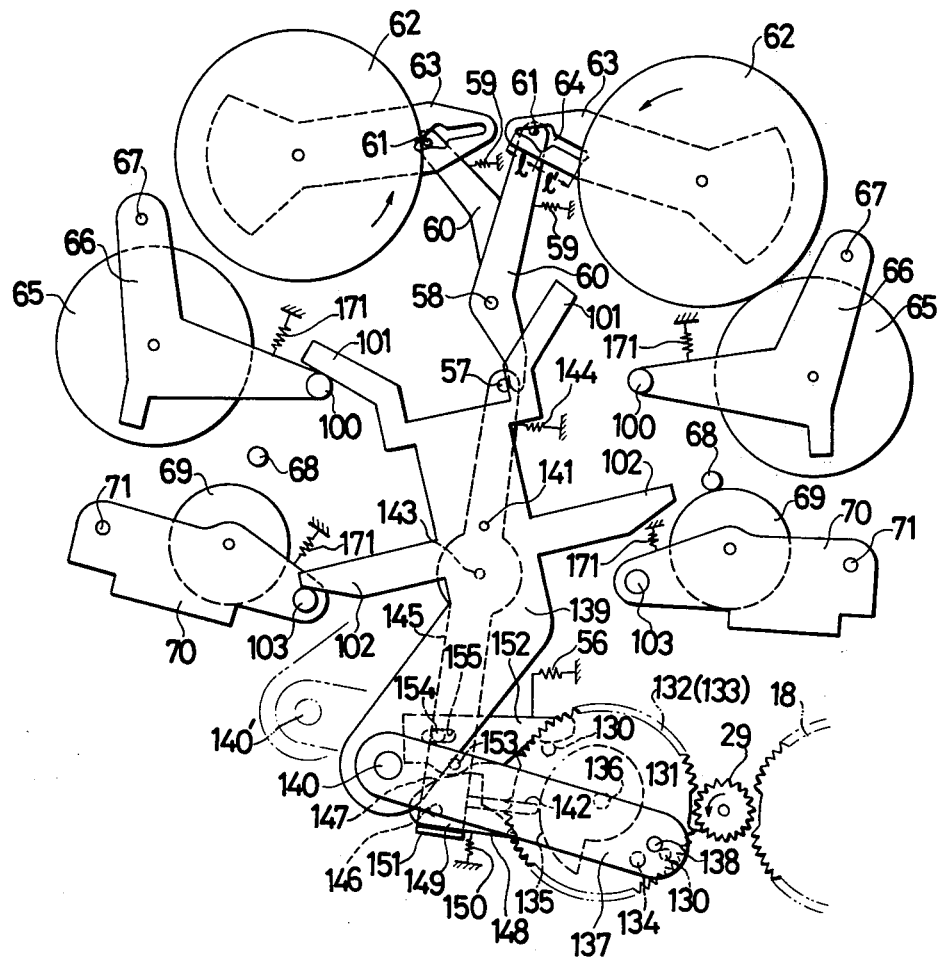

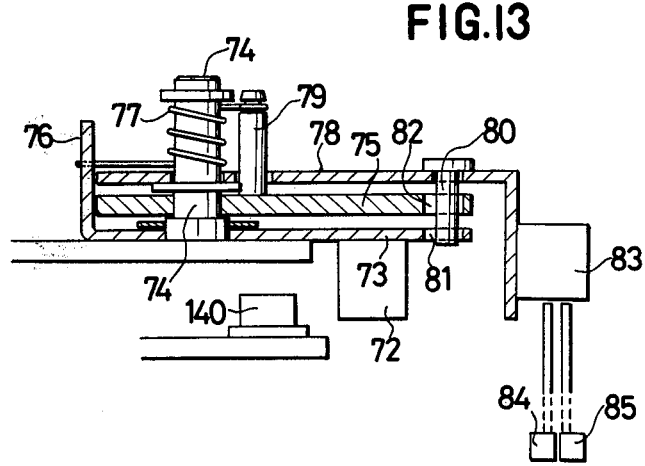
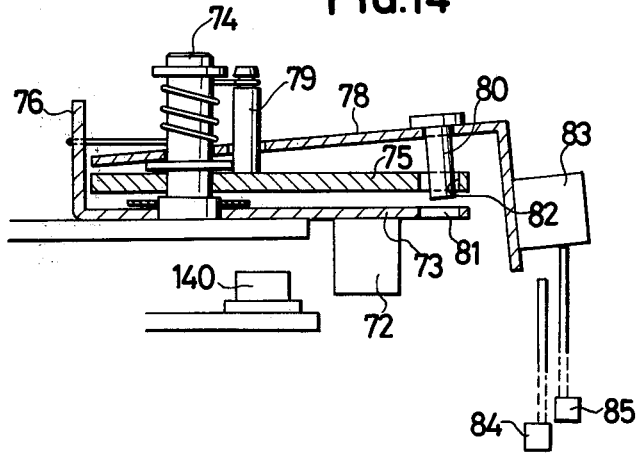

CASSETTE TAPE EJECTING MECHANISM

BACKGROUND OF THE INVENTION

This invention relates to a novel cassette tape ejecting mechanism which is operative automatically or manually, employing a driving gear wheel for a driving source. Further, the invention is applicable to the automatic reversal mechanism when required.

There has been provided a cassette tape recorder having both manual and automatic cassette tape ejecting means. Such a cassette tape recorder is disclosed in Japanese Patent Publication No. 36413/1972. In this cassette tape recorder a plunger is operated by means of tape ending signals which are generated when the tape is completely wound from one tape reel to the other so that the cassette tape can be shifted from the play position to the receiving position and then the cassette tape can be ejected, utilizing one reciprocating movement of the plunger. It is, however, impossible to obtain sufficient power to eject the cassette tape. As a result, a strong spring is necessary to shift the cassette tape from the play position to the receiving position to eject the cassette tape. Therefore, the problem is that the spring force must be always maintained constant and the reliability of the spring is low. Further, such a plunger is markedly large in size. Therefore, such a plunger is unsuitable for miniaturization of the cassette tape recorder.

SUMMARY OF THE INVENTION

Briefly, in order to eliminate the above noted defects, the invention provides a cassette tape ejecting mechanism wherein a driving wheel is employed as a driving source without the plunger device described above whereby a manual cassette tape ejecting operation can be achieved. Further, in the invention, an automatic cassette tape ejecting operation can be carried out by sensing completion of the tape winding. Furthermore, either of the manual operation or the automatic operation is selectively carried out when required.

BRIEF DESCRIPTION OF THE DRAWINGS

In the accompanying drawings:

FIG. 7 illustrates the engagement between the driving and driven gear wheels shown in FIG. 1;

FIG. 8 shows a plan view of the automatic reversal mechanism of the invention;

FIG. 13 shows a cross sectional view of the tape ejection operating mechanism shown in FIG. 10; and FIG. 14 shows another state of the tape ejection operating mechanism.

DETAILED DESCRIPTION OF THE INVENTION

This invention will be hereinafter described in detail referring to the accompanying drawings.

Figure 1:
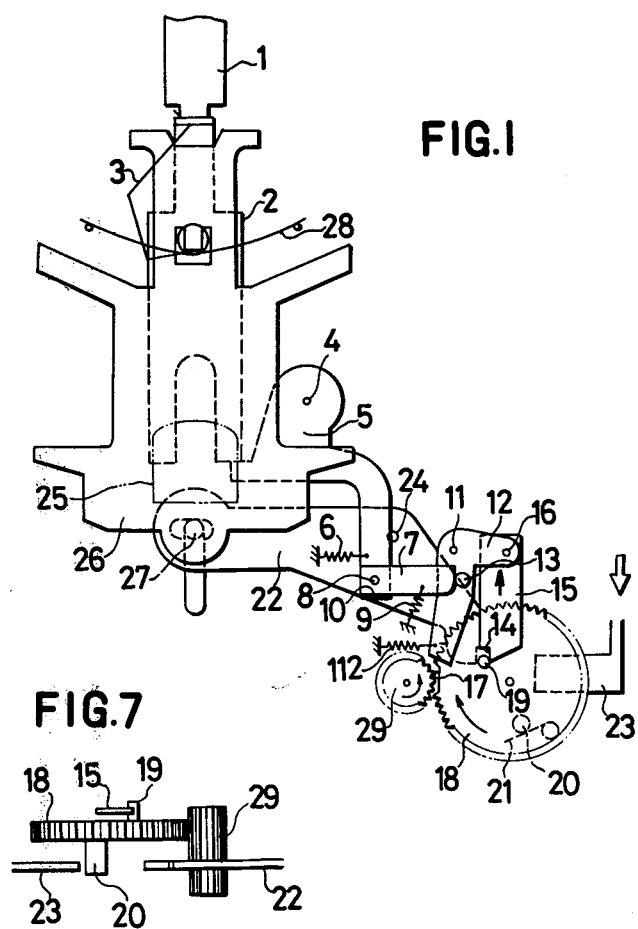
FIG. 1 shows a plan view of the depressing button and the associated mechanism of the present invention.

FIG. 1 shows a driving mechanism for ejecting of a magnetic cassette tape. In FIG. 1, reference numeral 1 designates an ejecting or depressing button supported by a frame body (not shown). The depressing button 1 is brought into contact with an end of a reciprocatingly movable sliding plate 2 by a spring 3 up and down (in FIG. 1). The other end of the sliding plate 2 is always in contact with an end of a first lever 5 by a spring 6 an end of which is secured to the frame body. The first lever 5 is pivotally secured through a shaft 4 to the frame body in its intermediate portion. The other end of the first lever 5 and an end of abutting member 7 are pivotally secured by a shaft 8. A one side of the abutting member 7 is connected to an end of a spring 9 the other end of which is secured to the frame body so that the abutting member 7 is urged to rotate in the clockwise direction (in FIG. 1). An end side portion of the abutting member facing the spring 9 is always in contact with a bent portion 10 of the first lever 5. The other end of the abutting member can be in abutment with a pin 13 secured to a second lever 12 an intermediate portion of which is pivotally mounted on the frame body through a shaft 11. A gear wheel rotation preventing lever 15 having an engaging portion 14 in an end thereof is movable up and down (in FIG. 1) by pivotally connecting the other end of the preventing lever 15 and one end of the second lever 12 by means of a shaft 16. The other end of the second lever 12 is connected to one end of a spring 112 the other end of which is secured to the frame body. The engaging portion 14 of the preventing lever 15 is engagable with a first pin 19 secured to a driven gear wheel 18 having a portion 17 in which gear teeth are not formed. The gear wheel 18 is pivotably secured to the frame body.

A second pin 20 is mounted on a desired eccentric portion of the gear wheel 18. A rod spring 21, one end of which is secured to a suitable fixed portion, such as the frame body, is elastically contacted to the second pin 20 so that the driven gear wheel 18 can be rotated in the clockwise direction (in FIG. 1); that is, the above mentioned first pin 19 is urged to be engaged with the engaging portion 14 of the preventing lever 15. An end of a third lever 22 for retracting a magnetic transducer head base plate 26 and an end of an operating lever 23 related to a cassette tape receiving mechanism, which will be described later, exist within the circular locus of the second pin 20.

An intermediate portion of the above described third lever 22 is secured to the frame body by a shaft 24. The other end of the third lever is connected through a pin 27 to the magnetic transducer head base plate 26 which is movable up and down (in FIG. 1). The base plate 26 is urged to move upwardly by a spring 28.

As shown in FIG. 7, the driven gear wheel 18 can be meshed with a gear wheel 29 having a small diameter, which is always rotated by a main motor of the tape recorder.

Figure 2:
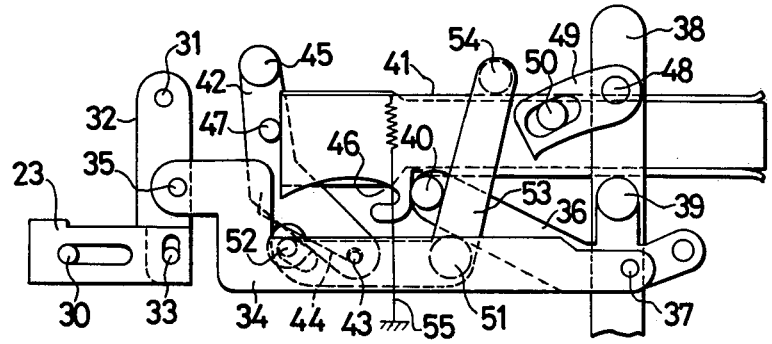
FIG. 2 shows a side view of the cassette tape receiving portion of the invention.
Figure 6:
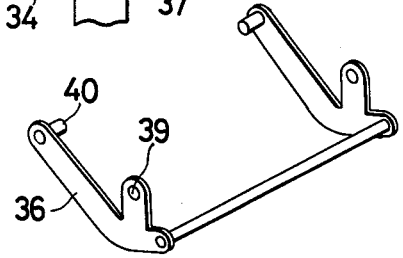
FIG. 6 shows a perspective view of the sixth lever shown in FIGS. 2 to 5.
Figure 4:
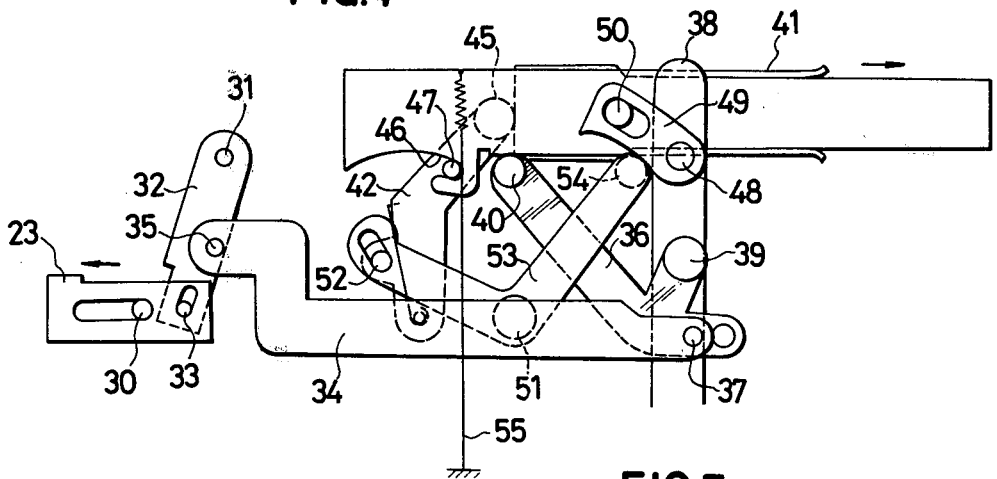

Next, a cassette tape receiving mechanism related to the operating lever 23 shown in FIG. 1 will now be described. The operating lever 23 is supported to be movable through a guide member 30 to the right and left as shown in FIGS. 2 and 4. The other end of the operating lever 23 is connected through a pin 33 to one end of a fourth lever 32 the other end of which is secured to the frame body through a shaft 31. An intermediate portion of the fourth lever 32 is pivotally connected to one end of a fifth lever 34 by a pin 35. The other end of a fifth lever 34 is connected to a sixth lever 36 by a pin 37. The sixth lever 36 is supported to a fixed plate 38 by a supporting shaft 39. A bottom surface of a cassette tape receiving member 41 is supported by a pin 40 which is secured to one end of the sixth lever 36. FIG. 6 shows a perspective view of a pair of the sixth levers 36. On the other hand, one end of a seventh lever 42 is pivotally secured to the frame body by a shaft 43 and at the same time, the seventh lever 42 is urged to be clockwise rotated around the shaft 43 by means of a spring 44. The seventh lever 42 has an ejecting portion 45 for ejecting the cassette tape received in the receiving member 41 and an engaging rod 47 which is engagable with a locking portion 46 of the receiving portion.

The receiving member 41 is supported through a pin 50 by one end of a connecting link 49 the other end of which is pivotably secured to the fixed plate 38 by a shaft 48. The receiving member 41 is provided with a supporting lever 53, one end of which is connected to the seventh lever 42 by a shaft 52, an intermediate portion of which is pivotably secured to the frame body by a shaft 51 and the other end of which has a supporting portion 54. The receiving member 41 is spring-biased downwardly by a spring 55.

The operation will now be described.

FIG. 1 shows a play condition of a cassette tape recorder. Under this condition the driving gear wheel 29 which is always rotated in one direction, for example, counterclockwise, is disengaged with the driven gear wheel 18 on account of the non-toothed portion 17 of the driven gear wheel 18. Rotational force of the driving gear wheel 29 is not transmitted to the driven gear wheel 18, and the driven gear wheel 18 is stopped.

In such a play state, ejecting button 1 is manually depressed in order to eject the cassette tape. Then, successive operations occur as follows. The sliding plate 2 is downwardly moved, the first lever 5 is rotated counterclockwise about the shaft 4, and the pin 13 of the second lever 12 is pushed by the abutting plate 7 secured to the end of the first lever 5. As a result, the second lever 12 is c.c.w. rotated about the shaft 11, the preventing lever 15 connected to the second lever 12 is moved upwardly, and the contact between the first pin 19 and the engaging portion 14 is disengaged. By this release, the gear wheel 18 is slightly rotated by the rod spring 21 in the clockwise direction. As a result, the driven gear wheel 18 is meshed with the driving gear wheel 29. The driven gear wheel 18 is supplied with the rotational force from the driving gear wheel 29 to be rotated therewith.

With this rotation of the driven gear wheel 18, the end of the second lever 22 which exists in the locus of the second pin 20 is rotated counterclockwise in abutment with the pin 20. Consequently, the third lever 22 is rotated around the shaft 24 in the counterclockwise direction and simultaneously, the transducer head base plate 26 connected to the second lever 22 is drawn downwardly to thereby separate the transducer head 25 mounted on the base plate 26 from the magnetic tape surface. Then, the base plate 26 is locked at the locking position by the locking mechanism (not shown) in the well known manner.

With the successive rotation of the driven gear wheel 18, the operating lever 23 which exists in the locus of the second pin 20 is moved in abutment therewith. By the movement of the operating lever 23, the ejecting operation of the cassette tape is carried out as follows.

The operating lever 23 is moved by the second pin 20, and thereafter, the pin 20 is passed away from the lever 23. When the non-toothed portion 17 again faces the gear wheel 29, the engaging portion 14 of the preventing lever 15 is abutted to the first pin 19 so that the driven gear wheel 18 is stopped. The cassette tape ejecting operation is carried out as a cyclic operation mentioned above.

In the above mentioned initial operation of the cassette tape ejection, the first pin 19 is only released from the engaging portion 14 and thereafter, the engagement between the driven and driving gear wheels is automatically achieved. Accordingly, the initial operation of the ejection is carried out only by slightly depressing the depressing button 1.

The operation in which the operating lever 23 is moved in abutment with the second pin 20 to thereby eject the cassette tape will be hereinafter described.

Figure 3:
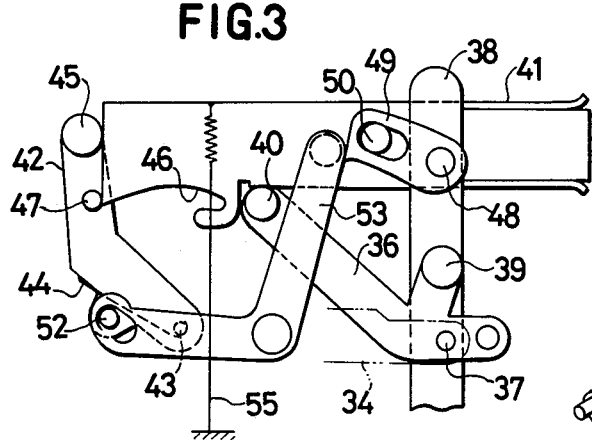
FIGS. 3 to 5 show successive states of the cassette tape receiving portion.

FIG. 2 shows the state wherein the cassette tape is received in the cassette tape receiving member 41 which is fully lowered, i.e., the play position. The operating lever 23 is moved to the left (in FIG. 2), the fourth lever 32 is rotated clockwise about the shaft 31 and the fifth lever 34 is moved to the left as best shown in FIG. 4. As a result, the sixth lever 36 is rotated clockwise about the supporting shaft 39 to lift the cassette tape receiving member 41 against the spring 55 by means of the pin 40. With the lift of the receiving member 41, the connecting link 49 pushed by the pin 50 and rotated about the shaft 48 in the clockwise direction. The lift of the receiving member 41 is advanced through the state shown in FIG. 3. Contact between a rear end portion of the receiving member 41 and the engaging rod 47 is disengaged as shown in FIG. 4. As a result, the seventh lever 42 is rotated clockwise about the shaft 43 by the spring force of the spring 44, the engaging rod 47 of the seventh lever 42 is received in the locking portion 46 to thereby prevent the cassette receiving member 41 from being lowered. During this operation, the ejecting portion 45 of the seventh lever 42 serves to eject the cassette tape.

With the rotation of the seventh lever 42, the supporting lever 53 is rotated clockwise about the shaft 51 to thereby contact the supporting end 54 of the lever 53 with the lower surface of the connecting link 49. The cassette tape is positively supported as shown in FIG. 4.

Figure 5:
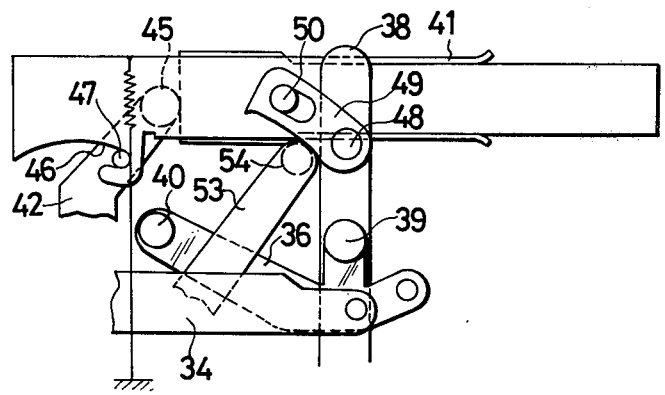

During such operation, the second pin 20 of the driven gear wheel 18 is further rotated to be disengaged from the operating lever 23, and the operating lever 23 is restored to the position shown in FIG. 1, and also the sixth lever 36 is restored to the position shown in FIG. 5. However, the supporting lever 53 is still maintained at the position shown in FIG. 5, and by the next cassette replacing operation, the supporting lever is returned to the original position. Of course, when the base plate 26 is separated from the tape surface, pinch rollers and idlers are separated from capstan shafts and reel discs.

As mentioned above, the manual operation wherein the cassette tape is ejected by depressing the depressing button 1 is carried out.

An automatic operation, wherein the cassette tape is automatically ejected by a tape take-up completion detecting device when the tape is completely wound up on the reel, can be achieved according to the invention. The tape take-up completion or tape end detecting device also relates to an automatic reversal mechanism.

These mechanism will now be described.

Referring to FIG. 8, the above described driving gear wheel shaft 29 is meshed with another driven gear wheel 132 having two pins 130 on its lower surface and two non-toothed portions in its circumferential periphery at equal intervals, respectively and a complete gear wheel 133 is coaxially supported under the gear wheel 132 for rotational force transmission. The complete gear wheel 133 is provided integrally with a pin 134 and a cam 135 which will be described later. Both of the gear wheels 132 and 133 are pivotably supported on a shaft 136. One end of a connecting rod 137 is pivotably connected to a pin 138 implanted in the gear wheel 132 while the other end thereof is pivotably connected to an end portion of a main lever 139 through a pin 140. The main lever 139 is pivotably secured to the frame body by a shaft 41 at its intermediate portion.

An abutting rod 142 extending from a first swing lever 145 is brought into contact with a cam profile of the above described cam 135. The first swing lever 145 is urged to rotate in the clockwise direction by a spring 144. A pin 146 is implanted in an end portion of the swing lever 145. A release lever 149 having a release profile portion 147 and pushing profile portion 148 is urged to be rotated in one direction by a spring 150 and is pivotably supported by the pin 146. The pushing profile portion 148 of the release lever 149 is contacted with a bent portion 151 of the first swing lever 145 in order to exist in a locus of a pin 134. On the other hand, the release profile portion 147 is engageable with a pin 153 implanted in a gear wheel rotation preventing lever 152.

The above preventing lever 152 is supported by a pin 154 which is implanted in the first swing lever 145 through a oblong hole 155, in order to be laterally moved. The preventing lever is always urged to be moved to the position where the end of the preventing lever can be contacted with the pin 130 by means of a spring 56 one end of which is secured to the frame body.

A pin 57 is provided at the end portion of the first swing lever 145 described above. The pin 57 is pushed by one end portion of a second swing lever 60 which is rotatably supported around a shaft 58 and which is urged to be rotated clockwise by springs 59 each one end of which is secured to the frame body. Pins 61 are implanted in the other bifurcated end portions of the second swing lever 60. The pins 61 are brought into contact with ends of arrow-shaped cam holes 64 in detecting levers 63 which are frictionally secured to the right and left reel discs 62.

Reference numeral 65 designates driving idlers and reference numeral 66, arm levers which support the driving idlers. Each of the arm lever 66 is pivotably secured by a shaft 67 to the frame body. Each of the arms 100 of the arm lever 66 is provided in order to push one of extending portions 101 of the main lever 139 to thereby achieve the rotational direction change-over operation.

Reference numeral 68 designates right and left capstan shafts; reference numeral 69, pinch rollers which are contacted to or separated from the capstan shafts; and reference numeral 70, supporting arms of the pinch rollers 69. The supporting arms 70 are supported by the shafts 71. Each of pins 103 mounted on the other ends of the supporting arms 70 abuts one of other extending portions 102 of the main lever 139 in order to achieve change-over operation.

In operation, the reel plates 62 are rotated by the idlers 65. The detecting levers 63 are also rotated as shown in FIG. 8. However, the detecting levers 63 are restricted in abutment with pins 61. The complete gear wheel 133 is rotated by the driving gear wheel 29 while the upper driven gear wheel 132 is not rotated since one of the pins 130 is in abutment with the preventing lever 152. The cam 135 formed integrally with the gear wheel 133 is rotated by the driving gear wheel 29. On the other hand, the abutting rod 142 is counterclockwise rotated through the pin 57 by the second swing lever 60 so that the abutting rod 142 is brought into contact with the cam 135. As a result, the first swing lever 145 is swung. With such swing, the second swing lever 60 is also swung along with the cam hole by length 1 which designates a head portion of the arrow shape.

The first swing lever 145 is swung by the rotation of the cam 135. However, since the second swing lever 60 is swung under the limitation of length 1, the abutting rod 142 does not reach the shouldered portion of the cam 135. The first swing lever is, therefore, swung slightly.

Figure 9:
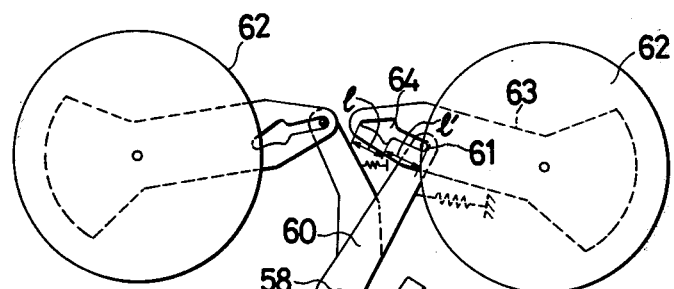
FIG. 9 shows another state of the automatic reversal mechanism of the invention.
Figure 10:
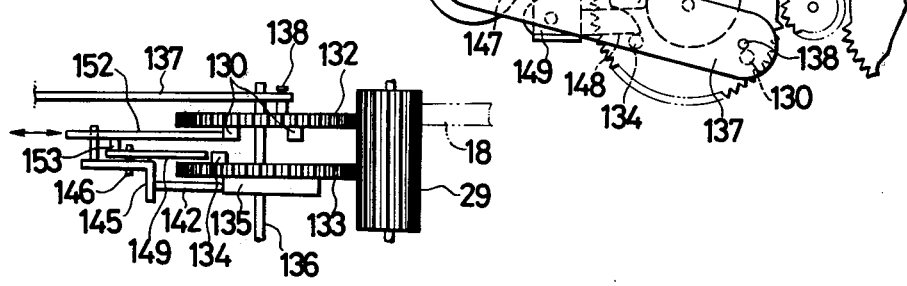
FIG. 10 illustrates the engagement between the driving and driven gear wheels shown in FIGS. 8 and 9.

This operation is continuously achieved during the tape play. When the tape is completely taken up from one reel to the other so that the tape tension is generated therein, the reel discs are stopped. As the result, the detecting lever 63 is also stopped. Even in this state, the complete gear wheel 133 is still rotated, accordingly, the first and second swing levers 145 and 60 are further swung, and the pin 61 is entered into the tail portion of the arrow-shaped cam hole, which is designated by l'. Then, the second swing lever 60 is greatly swung, and the first swing lever 145 is greatly swung in the counterclockwise direction about the shaft 143. Consequently, the abutting rod 142 of the first swing lever is retracted into the shouldered portion of the cam 135 as shown in FIG. 9.

With this retraction of the abutting rod 142, the pushing cam profile portion 148 of the release lever 149 is in contact with the pin 134 implanted in the complete gear wheel 133, and then the release lever 149 is counterclockwise rotated about the shaft 146 by the pin 134. The pin 153 of the preventing lever 152 is abutted by the release cam profile portion 147 of the release lever 149. The preventing lever 152 escapes in the left direction in FIG. 9. As a result, the pin 130 which is in abutment with the preventing lever 152 is released therefrom. At the same time, the main lever 139 is slightly rotated in the clockwise direction (in FIG. 8) by the springs 171 which are connected to the pinch roller supporting arms and the idler arms. The connecting lever 137 is slightly moved. With this movement, the driven gear wheel 132 having non-toothed portions is slightly moved in the clockwise direction so that the gear wheel 132 meshes with the driving gear wheel 29. Then the gear wheel 132 is continuously rotated in the clockwise direction.

With this rotation of the gear wheel 132, the connecting lever 137 is rotated significantly in the clockwise direction (in FIG. 8). Therefore, the right and left idlers 65 and the right and left pinch rollers 69 are changed over opposite to the state shown in FIG. 8, respectively. Then the driven gear wheel 132 is rotated half of a rotation, and when the next non-toothed portion is positioned to face the driving gear wheel 29, the pin 130 is in abutment with the preventing lever 152 and the driven gear wheel 132 is stopped. Thus, the automatic tape reversal winding is carried out.

As mentioned above, the invention provides tape winding completion detecting mechanism including a novel automatic tape reversal winding mechanism. An ejection of the cassette tape by means of the operation of the tape winding completion detecting mechanism will now be described.

Figure 11:
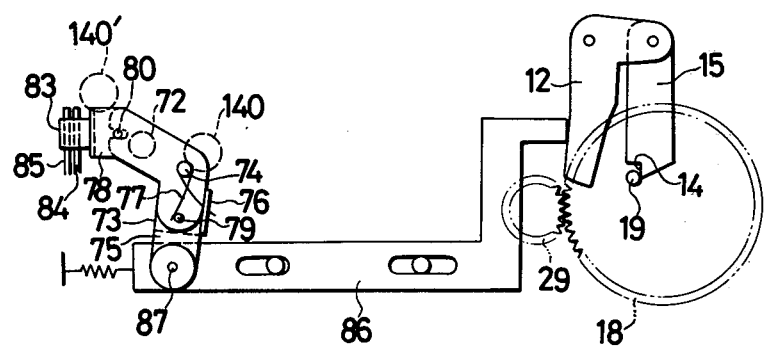
FIG. 11 shows a plan view of the tape ejection operating mechanism in connection with the automatic reversal mechanism shown in FIGS. 8 and 9.

When the tape is completely taken up in the state shown in FIG. 8, the main lever 139 is swung in the clockwise direction about the shaft 141 and the pin 140 of the main lever 139 is moved to the position 140' as shown in FIG. 8 by a phantom line. On the other hand, in FIGS. 11 and 13, a first driven lever 73 having a pin 72 which is moved by the above described pin 140 is rotatably supported by a shaft 74 implanted in the frame body. A second lever 75 which is rotatably supported commonly by the above described shaft 74 is provided above the first lever 73. A side portion of the first driven lever 73 is abutted with a bent portion 76 of the first driven lever 73. Further, a connecting lever 78 is provided above the second driven lever 75 and is movable to be inclined as shown in FIG. 14. A pin 79 extends from the second driven lever 73 through a hole of the connecting lever 78. A connecting pin 80 is provided to the connecting lever 78. The connecting pin 80 is engaged with holes 81 and 82 formed in the first and second driven levers 73 and 75 and can be freely disengaged therefrom. A projecting portion 83 is formed on the connecting lever 78. A manual reversal button 84 and an automatic reversal button 85 can push the projecting portion 83 through associated rods.

One end of an operating lever 86 is pivotably connected to the second driven lever 75 at a shaft 87 and the other end of the operation lever can abut the above described second lever 12.

Figure 12:
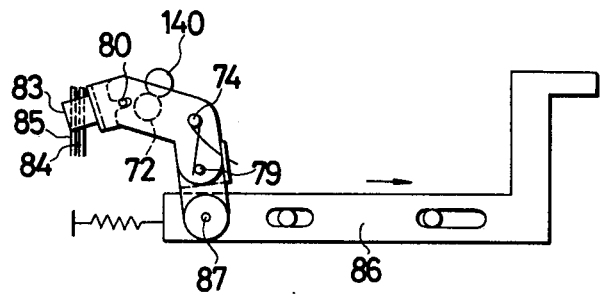
FIG. 12 shows another state of the tape ejection operating mechanism.

As shown in FIG. 8, in the tape winding completion, the pin 140 is moved to the position 140' by the rotation of the main lever 139, and when the pin 140 abuts the projection 72, the first driven lever 73 is counterclockwise rotated about the shaft 74. Since in this stage, the pin 80 is engaged with the hole 81 of the first lever 73 and the hole 82 of the second lever 75 so as to connect the both levers 73 and 75, the second lever 75 is also counterclockwise rotated, as a result of which the operating lever 86 is moved in the direction of the arrow as shown in FIG. 12. With the movement of the operation lever 86, the end of the operating lever 86 pushes the second lever 12. Accordingly the engagement between the preventing lever 15 and the driven gear wheel 18 is released, the gear wheel 18 is rotated by the rod spring 21, and the drive gear wheel 18 is meshed with the driving gear 29. Then, in the same manner as shown in FIGS. 1 and 2, the cassette tape ejection is carried out.

When the automatic reversal selecting button 85 is operated and the connecting lever 78 is lifted up, as shown in FIG. 14 the connecting pin 80 is released from the first driven lever 73. Therefore, in the tape winding completion, even if the pin 140 pushes the pin 72, the second driven lever 75 is not rotated. Accordingly, since the operating lever 86 does not push the second lever 12, the automatic cassette tape ejection is not carried out but only the automatic reversal operation is carried out.

Namely, it is possible to select the automatic ejection or the automatic reversal when the tap is completely taken up, according to the operation of the button 85.

In the tape play, when the operator reverses the tape using the manual reversal button 84, the pin 140 is moved. Therefore, if the connecting pin 80 is engaged with the hole 81, (in the automatic ejection), the tape is ejected against the intention in which the operator wants to reverse the tape. In view of this matter, when the manual reversal button 84 is operated, the engagement between the connecting pin 80 and the first driven lever 81 must be compulsively released so that the automatic ejection can not be achieved.

As mentioned above, if the ejecting button is slightly depressed, or if the tape winding completion detecting means is operated so that the driven gear wheel is operatively rotated, the cassette tape is automatically ejected according to the present invention.

In the conventional cassette tape ejecting means, in order to eject the cassette tape, the stopping or ejecting button must be forcively or deeply depressed by the operator's finger because the cassette tape received in the cassette tape receiving portion must be lifted by the linkage means associated with the ejecting button.

Especially in the conventional cassette tape ejecting means for a cassette tape recorder installed in an automobile, which is operated during driving, it is very difficult to handle the cassette tape recorder having such ejecting means. Further, in such a tape recorder that the automatic ejecting mechanism in the tape end is not provided therein the ejecting operation must be manually carried out.

According to the present invention, the above described defects are completely overcome.

What is claimed is:

1. A cassette tape ejecting mechanism for a cassette tape recording device having: a frame body; a pair of tape discs above which the cassette tape is set; a pair of capstan shafts; a pair of pinch rollers; a pair of pinch roller supporting arm levers; a pair of driving idlers frictionally engagable with the tape discsa; idler supporting arm levers; a cassette tape ejecting button; and a cassette tape receiving member movable from the cassette tape play position to the cassette tape receiving-/ejecting position, said cassette tape ejecting mechanism characterized by:
  (a) driving gear wheel 29 rotated always in one direction, having gear teeth in its full circumferential surface and pivotally secured to the frame body;
  (b) a first driven gear wheel 18 having at least one non-toothed portion and toothed portions and rotated together with said driving gear wheel when the toothed portion thereof is meshed with the driving gear wheel;
  (c) biasing means 21 urging to engage said first driven gear wheel with the driving gear wheel;
  (d) first gear wheel rotation preventing means 15 in abutment with an engaging pin 19 implanted in the driven gear wheel for preventing said first driven gear wheel from being rotated when the non-toothed portion thereof faces the driving gear wheel, said rotation preventing means being biased to one direction;
  (e) first release means 12 for releasing the engagement between the preventing means and the engaging pin so that the first driven gear wheel is meshed with the driving gear wheel; and
  (f) first transmitting means 23 for transmitting the rotational force of the driven gear wheel to the cassette tape receiving member when the driven gear wheel is rotated.

2. A cassette tape ejecting mechanism as defined in claim 1, further comprising tape end detecting means including:
- a first swing lever 145 pivotally secured to the frame body by a pin 143, having an extending rod 142 from one end portion thereof and a pin 57 on the other end portion thereof and biased to one direction;
- a second swing lever 60 pivotally secured to the frame body by a pin 58 and having a one end and a bifurcated end, said one end abutting said pin of the first swing lever and said bifurcated ends having engaging pins 61, said swing lever is biased to one direction; and
- a pair of detecting levers frictionally secured to the reel discs, each of said detecting levers having a arrow-shaped cam hole which is engaged with said engaging pin of the second swing lever,
- whereby when the tape is fully taken up, each of pins of the second swing lever is moved into the tail portion of the arrow-shaped cam to thereby greatly swing the first swing lever.

3. A cassette tape ejecting mechanism as defined in claim 2, further comprising for automatically ejecting the cassette tape:
- a second driven gear wheel 132 having at least one non-toothed portion and toothed portions and rotated together with said driving gear wheel when the toothed portion thereof is meshed with the driving gear wheel;
- a third driven gear wheel 133 having gear teeth in its full circumferential surface, being coaxial with the second driven gear wheel, said third driven gear being always rotated with engaging with the driving gear wheel;
- a second gear wheel rotation preventing means for preventing the second driven gear wheel from being rotated;
- a second transmitting means for releasing the first gear wheel rotation preventing means;
- a main lever 139 having a pair of first levers 102 and a pair of second levers 101, which selectively contact with a pair of pinch roller supporting arms and a pair of driving idler arms, respectively, said main lever pivotally secured to the frame body;
- a connecting lever 137 rotatably connecting said second driven gear wheel 133 and said main lever 139; and
- a pin 140 for rotatably connecting the main lever and the connecting lever, said pin releasing said first gear wheel rotation preventing means through said second transmitting means when said tape end detecting means mechanically senses the tape end.

4. A cassette tape ejecting mechanism as defined in claim 2, further comprising for automatically reversing the tape winding direction:
- a second driven gear wheel 132 having at least one non-toothed portion and toothed portions and rotated together with said driving gear wheel when the toothed portion thereof is meshed with the driving gear wheel;
- a third driven gear wheel 133 having gear teeth in its full circumferential surface, being coaxial with the second gear wheel, said third driven gear being always rotated with engaging with the driving gear wheel;
- a second gear wheel rotation preventing means for preventing the second driven gear wheel from being rotated;
- a main lever 139 having a pair of first levers 102 and a pair of second levers 101, which selectively contact with a pair of pinch roller supporting arms and a pair of driving idler arms, respectively, said main lever pivotally secured to the frame body;
- a connecting lever 137 rotatably connecting said second driven gear wheel 133 and said main lever 139; and
- a pin 140 for rotatably connecting the main lever and the connecting lever 137,
- wherey the tape winding direction is automatically reversed when tape end detecting means mechanically senses the tape end.

5. A cassette tape ejecting mechanism as defined in claim 3 or 4, wherein said second gear wheel rotation preventing means includes a cam 135 having a shouldered portion and secured to the third driven gear wheel abutting the extending rod of the main lever; and a second gear wheel rotation preventing member 152; and a second release means 149 is pivotally secured to the first swing lever to thereby automatically reverse the tape winding direction when the tape is ended.

6. A cassette tape ejecting mechanism as defined in claim 4, further including operating lever means for preventing said first release means from being operated by maintaining the first gear wheel rotation preventing means at the original position.

* * * * *